July 8, 1941.  D. C. ROWE ET AL  2,248,786
APPARATUS FOR FORMING AND CUTTING SHEET METAL
Filed April 12, 1938  3 Sheets-Sheet 1

INVENTORS
DONALD C. ROWE, CLARENCE R. GRAHAM
& OMER L. WOODSON.
BY
ATTORNEY

July 8, 1941.  D. C. ROWE ET AL  2,248,786
APPARATUS FOR FORMING AND CUTTING SHEET METAL
Filed April 12, 1938    3 Sheets-Sheet 2
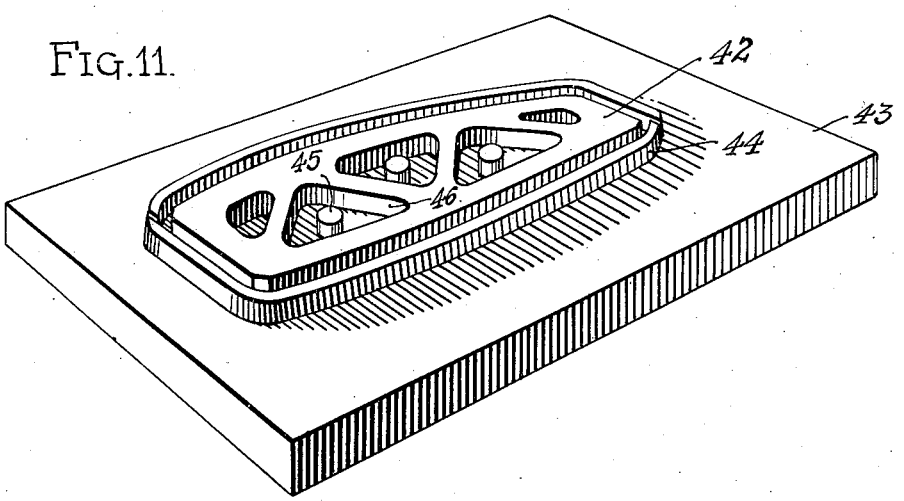
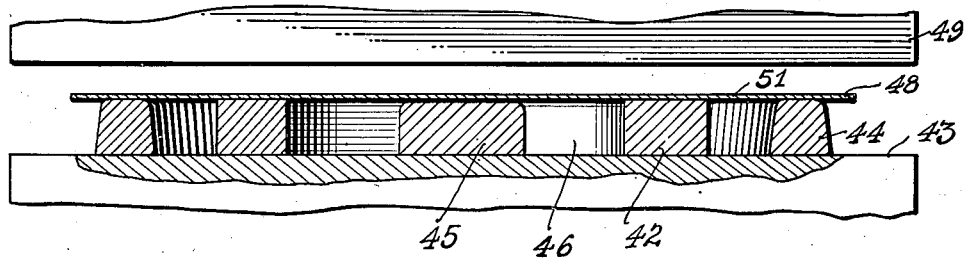
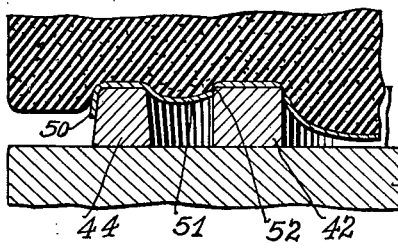
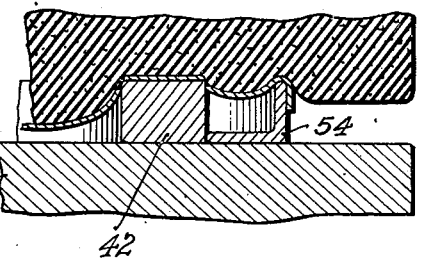
INVENTORS
DONALD C. ROWE, CLARENCE R. GRAHAM
BY & OMER L. WOODSON.
ATTORNEY

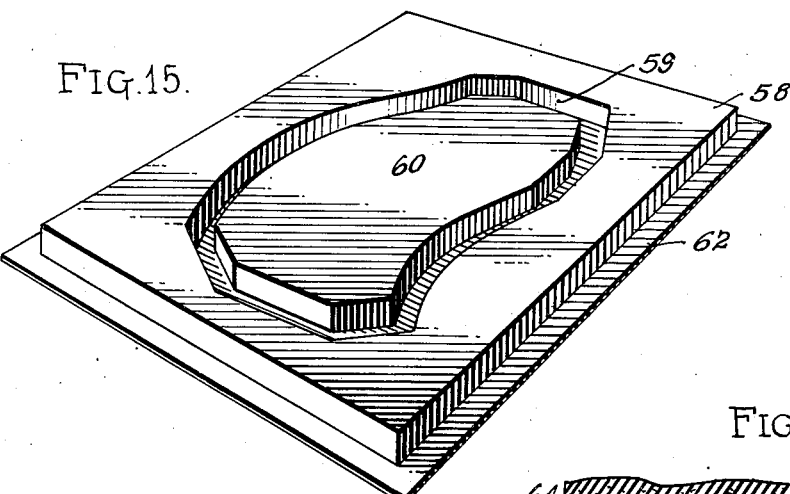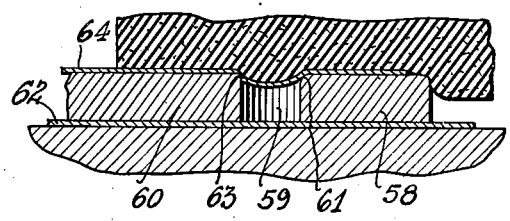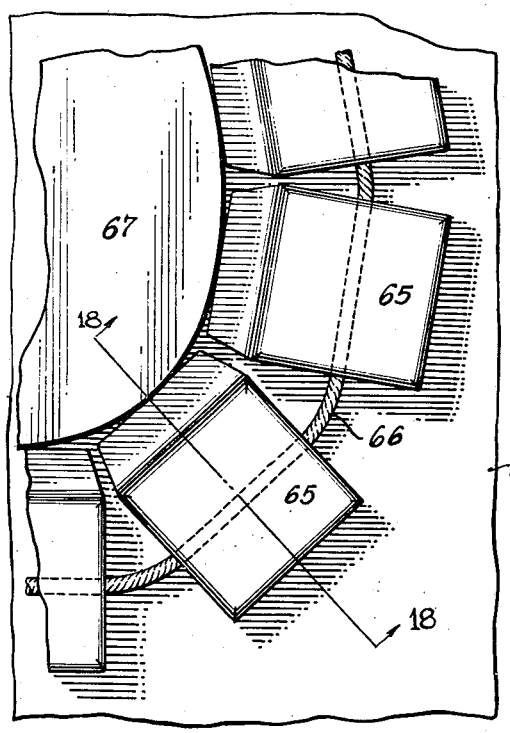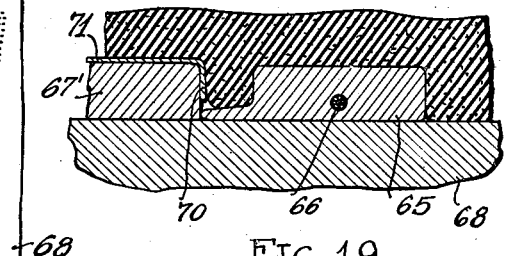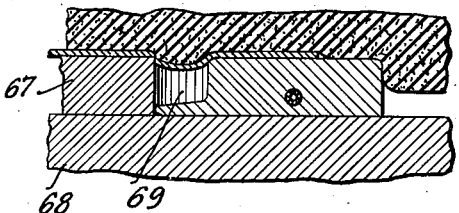

Patented July 8, 1941

2,248,786

UNITED STATES PATENT OFFICE 2,248,786

APPARATUS FOR FORMING AND CUTTING SHEET METAL

Donald C. Rowe, Williamsville, Clarence R. Graham, North Tonawanda, and Omer L. Woodson, Kenmore, N. Y., assignors to Curtiss-Wright Corporation, a corporation of Delaware Application April 12, 1938, Serial No. 201,488

1 Claim. (Cl. 164—18)

This invention relates to methods and apparatus for forming and cutting sheet metal, comprising particularly, improvements by which relatively heavy gauge material may be cut and formed by the use of simple dies and a press of moderate capacity.

Objects and advantages of the invention, including the improvements resulting from practice thereof in comparison with older methods, will be apparent in considering the following detailed description in connection with the drawings, in which.

Figure 7:
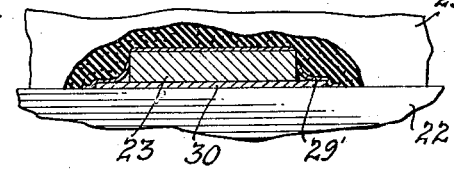
Figure 4:
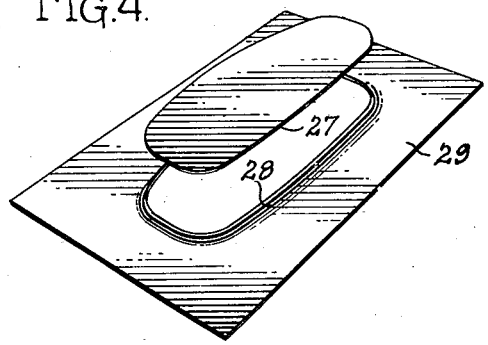
Fig. 4 is a perspective elevation of a punched piece and the blank from which it was punched according to the older method.
Figure 8:
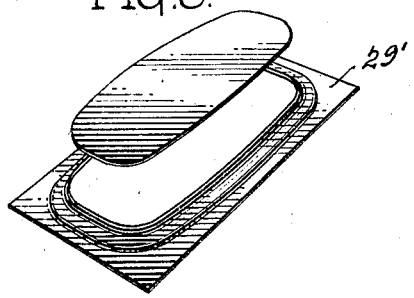
Figure 9:
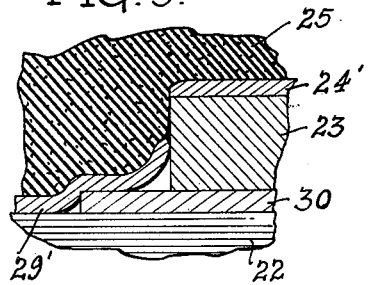
Figure 10:
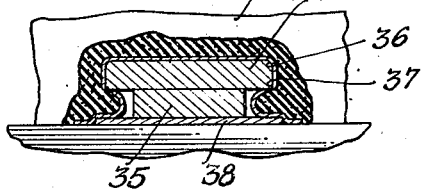

Figs. 5 to 8, inclusive, are respectively, views similar to Figs. 1 to 4, inclusive, showing a metal blank and punched piece according to one embodiment of our improved process;

Fig. 9 is an enlarged detail section of a portion of Fig. 7 showing the mode of punching;

Fig. 10 is a fragmentary sectional elevation of an arrangement by which material may be sequentially formed and cut by a single continued operation;

Fig. 11 is a perspective view of a die and bed plate including one arrangement of our improvements;

Fig. 12 is a fragmentary sectional elevation of a die, a blank thereon, and the bed and ram of a press;

Fig. 13 is a sectional elevation showing the mode of cutting a blank by the setup of Fig. 12;

Fig. 14 is a sectional elevation through a blank and die assembly during a punching process including an alternative embodiment of the invention;

Fig. 15 is a perspective view of a die plate according to another embodiment of the invention;

Fig. 16 is a sectional elevation during a cutting process embodying the die plate of Fig. 15;

Fig. 17 is a fragmentary plan of a bed plate, die and auxiliary blocks, comprising another form of the invention;

Fig. 18 is a fragmentary section through the bed plate, die, block and blank in the process of forming the sheet metal blank; and Fig. 19 is a view similar to Fig. 18 wherein the die is arranged for and is shown in the process of cutting a sheet metal blank.

Figure 1:
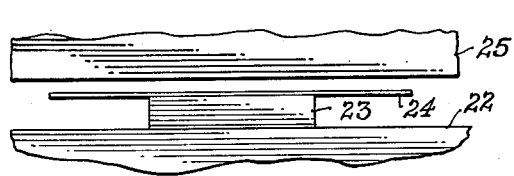
Fig. 1 is a fragmentary side elevation of a press, die, and metal blank ready for fabrication by the older process.
Figure 5:
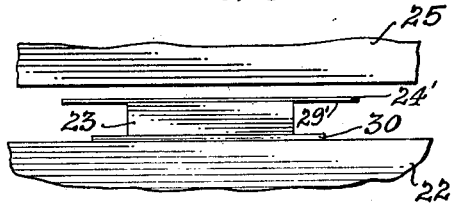
Figure 2:
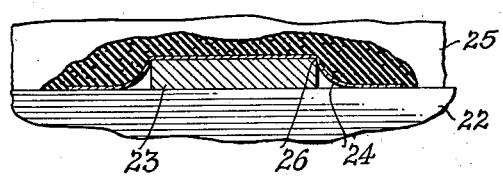
Figs. 2 and 3 are fragmentary sections showing steps in the process according to the older method.
Figure 6:
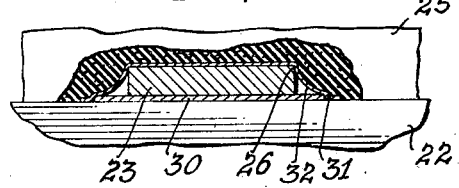
Figure 3:
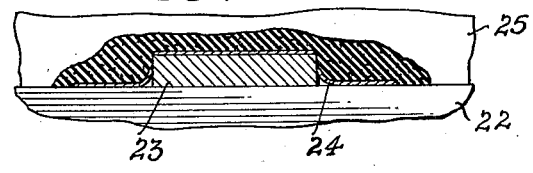

Referring first to Figs. 1 to 4, inclusive, as being exemplary of the prior art process, we show, a press bed 22, upon which rests a die block 23 and over which is laid a sheet metal blank 24, as in Fig. 1. The press ram is indicated at 25, being provided at its lower end with a sheet of rubber of appropriate thickness and hardness. In Fig. 2, the ram 25 has been lowered and as indicated, the rubber has pressed the unsupported edges of the metal blank 24 against the press bed 22. As the pressure on the ram is increased, the blank 24 is bent abruptly over the edge 26 of the die 23, which edge is sharp, and as the pressure on the ram increases further, the rubber, pressing the edge of the plate firmly against the press bed, exerts pressure along the fillet of the blank adjacent the edge 26 and finally parts the metal at said edge.

Figs. 5 to 9, inclusive, show an improvement in the basic process. Herein, an auxiliary plate 30, conforming in outline to that of the die 23, but being of the order of an inch bigger, all around, is placed beneath the die 23. The blank 24' may be of considerably smaller initial size. When the press ram 25 is forced toward the press bed, the unsupported border 29' of the blank is initially bent downwardly to contact the press bed, and as the border 29' tends to pull inwardly toward the die, it encounters the edge of the plate 30. Further pressure forms a slight bead 31 in the border 29', locking the material from further inward movement as press pressure is increased. Thereupon, subsequent press pressure is concentrated in the loop 32 to part the metal at the die edge 26. The effect of the plate 30 is to cause parting pressure in the blank 24' before the edge portion thereof has been deformed to right-angled relationship with respect to the top face of the die 23, with the result that the cutting is much cleaner and also, the ultimate pressure necessary to effect parting is considerably less than with the older process. It will also be seen, by comparing Figs. 4 and 8, that the waste border material, 29 and 29' respectively, is much less in the case of the improved process. In practicing the original process, waste material might run as high as 200% to 300%, whereas the inclusion of the plate 30 enabled a reduction of waste material to approximately 50%. The improvement further enables the cutting of much thicker material. For instance, in practicing the original process, material of .051 in thickness, was the effective maximum, whereas with the improvements here taught, metal up to .094 inch thick can be successfully sheared.

Fig. 10 shows an arrangement including a forming die 34 lying upon a spacer 35 of considerably smaller compass. The upper edges 36 of the forming die are chamfered or rounded, to avoid cutting, while the lower edges 37 of the die 34 are sharp to allow of cutting. The spacer 35 rests upon a plate 38 of larger compass than the die 34, which plate serves the same purpose as the above described plate 30. The metal blank is placed over the die 34, and when press pressure is applied through the rubber 39, the metal is first bent downwardly around the forming edges 36, further pressure causing engagement of the blank with the edge of the plate 38, this forming a stop to prevent inward extrusion of the metal between the die 34 and the plate 38. Subsequent pressure on the rubber causes parting of the edge of the blank at the cutting edge 37 of the die.

Figs. 11 to 13 show a further improvement in a cutting die arrangement by which further economies in material are obtained and by which thicker plates may be punched with less pressure than by prior methods. In this arrangement, a die 42 having a cutting edge rests upon a bed plate 43, and one or more bars 44, of substantially equal height to the die 42, are bent to the approximate form of the die and surround same, being spaced an appropriate distance from the edge of the die and being attached to the bed plate as by pins, bolts or tack welds. In cutting duralumin or aluminum up to .094 inch thick or thereabouts, the spacing of the bar from the die edge should be approximately ½" to ¾" depending on the thickness of the material. Auxiliary blocks 45, with non-cutting edges, may be placed within cutouts such as 46 in the die 42 for support of the blank. It is to be understood that the edges of the die plate 42, both internal and external, are all sharpened to provide cutting edges, whereas the edges of the bar 44 or block 45 are chamfered. Fig. 12 shows the relationship of the die 42, the bar 44 and the block 45 upon the press bed 43, with a sheet metal blank 48 placed thereon in readiness for cutting by the ram 49. Fig. 13 indicates the action of cutting as the rubber of the ram is pressed downwardly upon the plate 48. Initially, the rubber presses the outer edge 50 of the blank 48 around the outside of the bar 44, continued pressure bearing on the blank material 51 between the bar and die, with final cutting of the blank at the point 52. It will be here noted that the edge 50, bent around the bar, prevents inward pulling of the blank as pressure is imposed thereon, so that finally, the pressure of the rubber acts almost normal to the blank at the cutting edge 52 resulting in a shear at the cutting edge 52 which is exceptionally clean and smooth. As the blank shears, the material 51 moves downwardly and away from the edge of the die, so that upon raising of the press ram, the sheared form of metal may be readily lifted from the die and the excess material surrounding the die may likewise be easily lifted off without disrupting the relationship of the several parts upon the press bed.

Figs. 15 and 16 show an alternative form of die, subscribing to the principles of the invention, wherein a slot as at 59 is cut out of a rectangular steel plate 58 to define a central die 60. In use, the edges of the die 60 are sharpened, while the internal edges of the surrounding plate are chamfered as at 61, and both elements of the plate may be placed upon a thinner steel plate 62 and attached thereto permanently. The complete die, then, comprises the elements 60 and 58 which may be placed upon a press bed for cutting operations. The cutting process in using this form of die is similar to that in the previously described embodiment. The edge of a sheet metal blank 64 rests upon the element 58 and rubber pressure acts upon the blank portion overhanging the slot 59 to shear the metal at the cutting edge 63 of the die 60. The pressure of the rubber acts substantially normal to the cutting edge so that a clean shear is obtained along with relief of the blank edges so that easy removal of the blank and scrap after the shearing operation is afforded.

Figs. 17, 18 and 19 show the use of auxiliary blocks 65, strung together with a cable 66 and embracing either a cutting or forming die 67, all of these units resting upon a plate 68. The blocks 65 are of L-form as indicated in Figs. 18 and 19, defining with the die 67, a gap 69 into which part of the waste material of the metal blank is pressed when a cutting operation is in progress, or into which a flange such as 70 in Fig. 18 is pressed when such a flange is to be formed around a blank 71 on a forming die 67'. A string of these blocks, obviously, is very flexible in its application to dies of odd shape—a different number of blocks may be used on the cable 66, and the cable ends hitched together so that the blocks may not spread from the die when pressure is applied by the press ram.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications and changes.

What we claim is:

In means for cutting sheet metal, a bed, a first rigid plate resting thereon having a dulled edge, a die plate having peripheral cutting edge, the die plate resting on and being of smaller compass than said first plate, and a press ram including a resilient face adapted to bear upon a blank between the face and die, said face, upon continued application of press pressure, deforming the blank into engagement with the edge of said first plate, whereafter the blank is parted along said die plate cutting edge upon continued pressure application.

DONALD C. ROWE.
CLARENCE R. GRAHAM.
OMER L. WOODSON.